United States Patent
Tanaka

(10) Patent No.: US 8,079,615 B2
(45) Date of Patent: Dec. 20, 2011

(54) VEHICLE STEERING DEVICE

(75) Inventor: Seiji Tanaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 525 days.

(21) Appl. No.: 12/295,325

(22) PCT Filed: Oct. 15, 2007

(86) PCT No.: PCT/IB2007/003068
§ 371 (c)(1),
(2), (4) Date: Sep. 30, 2008

(87) PCT Pub. No.: WO2008/047202
PCT Pub. Date: Apr. 24, 2008

(65) Prior Publication Data
US 2010/0229674 A1    Sep. 16, 2010

(30) Foreign Application Priority Data
Oct. 16, 2006  (JP) ................................. 2006-281270

(51) Int. Cl.
*B60R 21/203* (2006.01)
(52) U.S. Cl. ..................................... 280/743.2; 280/731
(58) Field of Classification Search ............... 280/743.2, 280/731
See application file for complete search history.

(56) References Cited

U.S. PATENT DOCUMENTS

| | | | |
|---|---|---|---|
| 3,752,501 A | | 8/1973 | Daniel et al. |
| 6,224,093 B1 * | | 5/2001 | Ochiai et al. ................... 280/731 |
| 7,441,799 B2 * | | 10/2008 | Enders et al. .................. 280/731 |
| 7,665,757 B2 * | | 2/2010 | Miyata ........................ 280/728.2 |
| 2004/0145162 A1 | | 7/2004 | Abe et al. |
| 2005/0121889 A1 * | | 6/2005 | Enders et al. .................. 280/731 |
| 2006/0119083 A1 * | | 6/2006 | Peng et al. .................. 280/730.2 |
| 2007/0024035 A1 * | | 2/2007 | Yamachi et al. ............... 280/731 |
| 2007/0052217 A1 * | | 3/2007 | Miyata ........................ 280/730.1 |

FOREIGN PATENT DOCUMENTS

| | | |
|---|---|---|
| DE | 22 48 393 | 4/1973 |
| EP | 1 442 944 | 8/2004 |
| JP | 01 132444 | 5/1989 |
| JP | 11245 759 | 9/1999 |
| JP | 11 342819 | 12/1999 |

* cited by examiner

*Primary Examiner* — Paul N Dickson
*Assistant Examiner* — Nicole Verley
(74) *Attorney, Agent, or Firm* — Oblon, Spivak, McClelland, Maier & Neustadt, L.L.P.

(57) ABSTRACT

A vehicle steering device includes a rotatable steering handle including grips lying on left and right sides of the steering handle in a straight-ahead driving position with a non-grip space left on at least one of upper and lower sides of the steering handle; and an airbag provided in the steering handle that is deployed between the steering handle and a driver to restrain the driver in the event of a collision. The steering handle includes a support unit movable from a stowed position to an operative position on the vehicle's forward side from a reference plane including a rotating trajectory of a portion of the steering handle normally facing the driver. The support unit supports the rear surface of the airbag deployed in the non-grip space.

19 Claims, 16 Drawing Sheets

F I G . 12
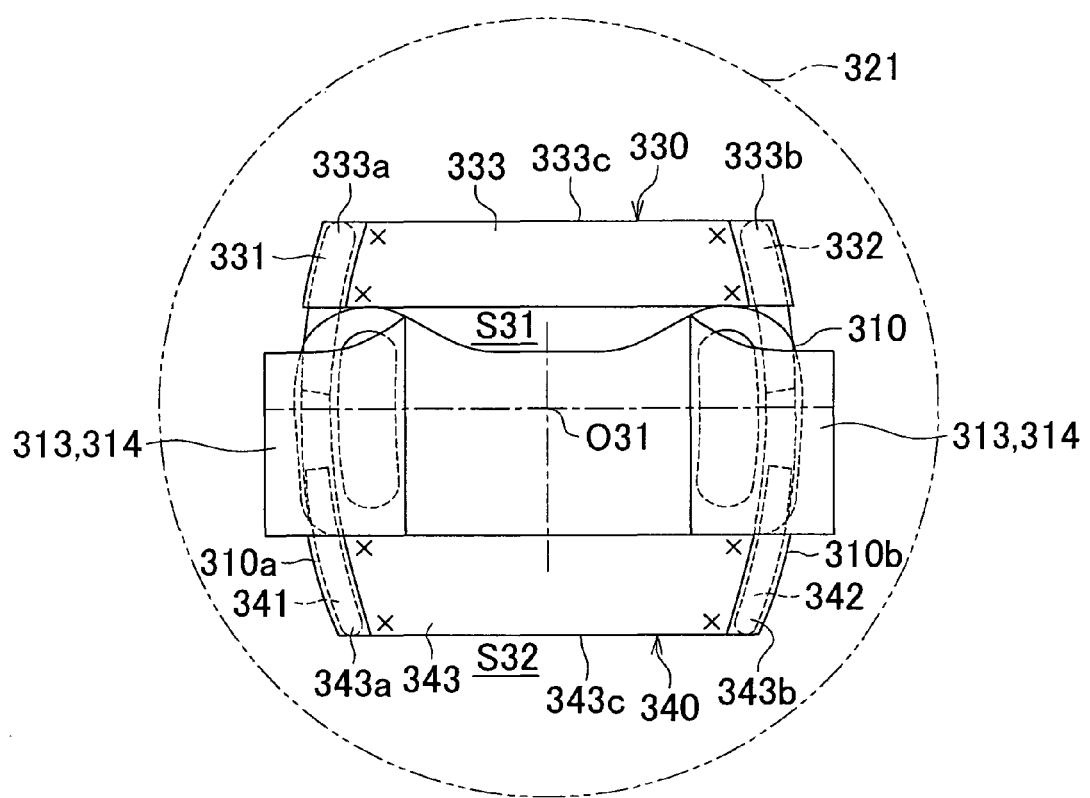

VEHICLE STEERING DEVICE

BACKGROUND OF THE INVENTION

1. Field of the Invention

The present invention relates to a vehicle steering device; and, more particularly, to a vehicle steering device that includes a rotatable steering handle having grips on the left and right sides in a straight-ahead driving position, the steering handle formed to leave a non-grip space (a space in which no grip is provided on the steering handle) on at least one of upper and lower sides thereof, and an airbag provided in the steering handle so that it can be deployed between the steering handle and a driver to restrain the driver in the event of a collision.

2. Description of the Related Art

The steering handle is of a non-circular shape and has no ability to reliably support a rear surface (vehicle's forward side) of the deployed airbag in the non-grip space thereof. Thus, the steering handle cannot effectively support a reaction force generated when restraining the driver with the airbag, making it impossible for the airbag to reliably secure driver restraint performance.

Japanese Patent Application Publication No. 11-342819 (JP-A-11-342819) describes, while taking this into account, a vehicle steering device designed so that an airbag storage casing can be split into upper and lower parts and opened in upward and downward directions during deployment of an airbag, thereby allowing the upwardly and downwardly opened casing to support a rear surface of the deployed airbag in a non-grip space. The casing needs to have an intrinsic strength (rigidity) sufficient to support the rear surface of the deployed airbag.

Because the upwardly and downwardly opened casing can receive (or support) the rear surface of the deployed airbag in the non-grip space, the vehicle steering device described in JP-A-11-342819 is capable of reliably restraining the driver. However, the casing could interfere (or collide) with the driver during its opening process. This is because the casing splits into the upper and lower parts during deployment of the airbag is opened along a trajectory that projects in a vehicle's backward direction from a reference plane including a rotating trajectory of a portion of a steering handle normally facing the driver.

SUMMARY OF THE INVENTION

A first aspect of the present invention provides a vehicle steering device that includes a rotatable steering handle having grips on the left and right sides of the steering handle in a straight-ahead driving position, the grips formed to leave a non-grip space (a space in which no grip is provided on the steering handle) on at least one of upper and lower sides of the steering handle; and an airbag provided in the steering handle and adapted to be deployed between the steering handle and a driver to restrain the driver in the event of a collision. Here, the steering handle includes a support unit movable from a stowed position (a storage position within the steering handle) to an operative position on a vehicle's forward side from a reference plane including a rotating trajectory of a portion of the steering handle normally facing the driver, when in the operative position, the support unit supports the rear surface of the airbag deployed in the non-grip space.

This makes it possible for the support unit to effectively withstand the reaction force generated when the airbag restrains the driver in the event of a vehicle collision. It is also possible for the airbag to reliably restrain the driver.

Furthermore, with the vehicle steering device of the present aspect, it is possible to prevent constituent parts of the support unit from coming into contact the driver during their movement. This is because the support unit is moved the stowed position (storage position within the steering handle) to the operative position along a trajectory that does not project from the reference plane toward the rear of the vehicle.

The grips may include rims projecting toward at least one of the upper and lower sides of the steering handle in the straight-ahead driving position and the support unit may include a tension member (a tension fabric, a tension string, a tension net or a sub-airbag) taughtly stretched between the rims when the support unit is in the operative position. In this case, the support unit can be made simple in structure and can be provided in a cost-effective manner.

Further, the tension member may include engagement portions movably engaged with the rims and a part of the airbag integrally attached to the engagement portions and taughtly stretched between the rims. In this case, it is possible to effectively utilize the airbag as the tension member.

Moreover, the support unit may include reaction force supporting arms rotatably attached to the steering handle and adapted to rotate toward the non-grip space. In this case, the reaction force supporting arms may include a pair of left and right arms and a tension member taughtly stretchable in the non-grip space may be provided between distal end portions of the reaction force supporting arms. The tension member may be a supplemental airbag.

Furthermore, the steering handle may have non-grip spaces lying on the upper and lower sides of the steering handle in the straight-ahead driving position, the support unit including an upper support unit and a lower support unit, the steering handle being downwardly offset with respect to a deployed shape of the airbag, the upper support unit having an upward displacement amount greater than a downward displacement amount of the lower support unit.

Alternatively, the steering handle may have non-grip spaces lying on the upper and lower sides of the steering handle in the straight-ahead driving position, the support unit including an upper support unit and a lower support unit, the steering handle being upwardly offset with respect to a deployed shape of the airbag, the upper support unit having an upward displacement amount smaller than a downward displacement amount of the lower support unit.

In addition, the support unit may include a linking unit for moving the support unit to the operative position in association with a deploying operation of the airbag. In this case, it is possible to move the support unit to the operative position by the deploying operation of the airbag. Accordingly, there is no need to use an actuator for moving the support unit to the operative position, which in turn makes it possible to provide the support unit in a cost-effective manner.

In addition, the support unit may be adapted to move toward the operative position independently of a deploying operation of the airbag and an actuator for moving the support unit to the operative position may be provided in the steering handle. The actuator is designed to operate in the event of a collision or when a collision is predicted. In this case, in the event of a collision, it is possible for the actuators to displace the support unit to the operative position prior to deployment of the airbag. It is also possible to reduce the possibility of interference (collision) which would occur between the support unit and the driver.

Moreover, the lower support unit may be designed to move toward the operative position prior to movement of the upper support unit. In this case, the lower support unit arranged closer to the driver than the upper support unit can move toward the operative position prior to movement of the upper support unit. Therefore, as compared to the case of simultaneous movement of the upper and lower support unit, it is possible to reduce the possibility of interference (collision) which would occur between the lower support unit and the driver.

BRIEF DESCRIPTION OF THE DRAWINGS

The above and other features and advantages of the present invention will become apparent from the following description of specified embodiment, given in conjunction with the accompanying drawings, in which:

FIG. 12 is a view for explaining an operation of the fourth embodiment shown in FIG. 11;

DETAILED DESCRIPTION OF EMBODIMENTS

Figure 2:
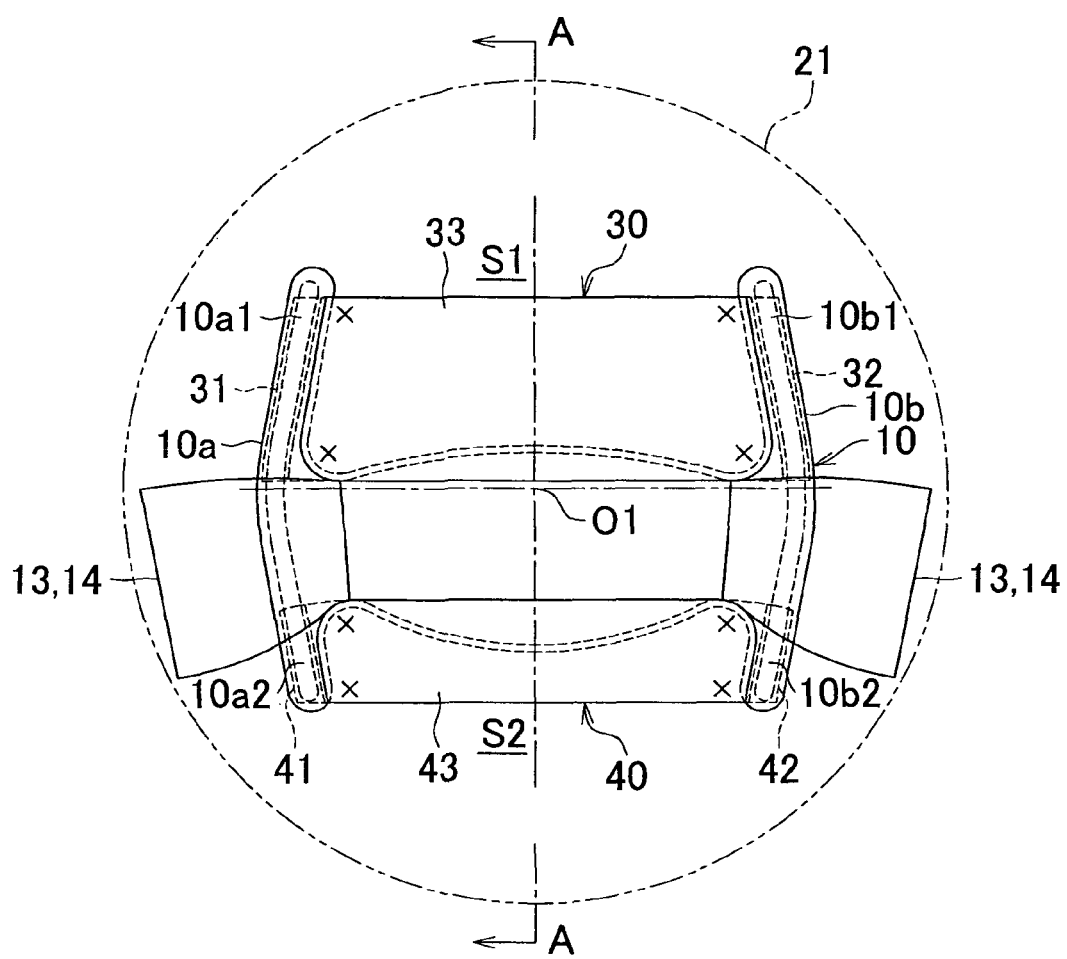
FIG. 2 is a view for explaining an operation of the first embodiment shown in FIG. 1.
Figure 3:
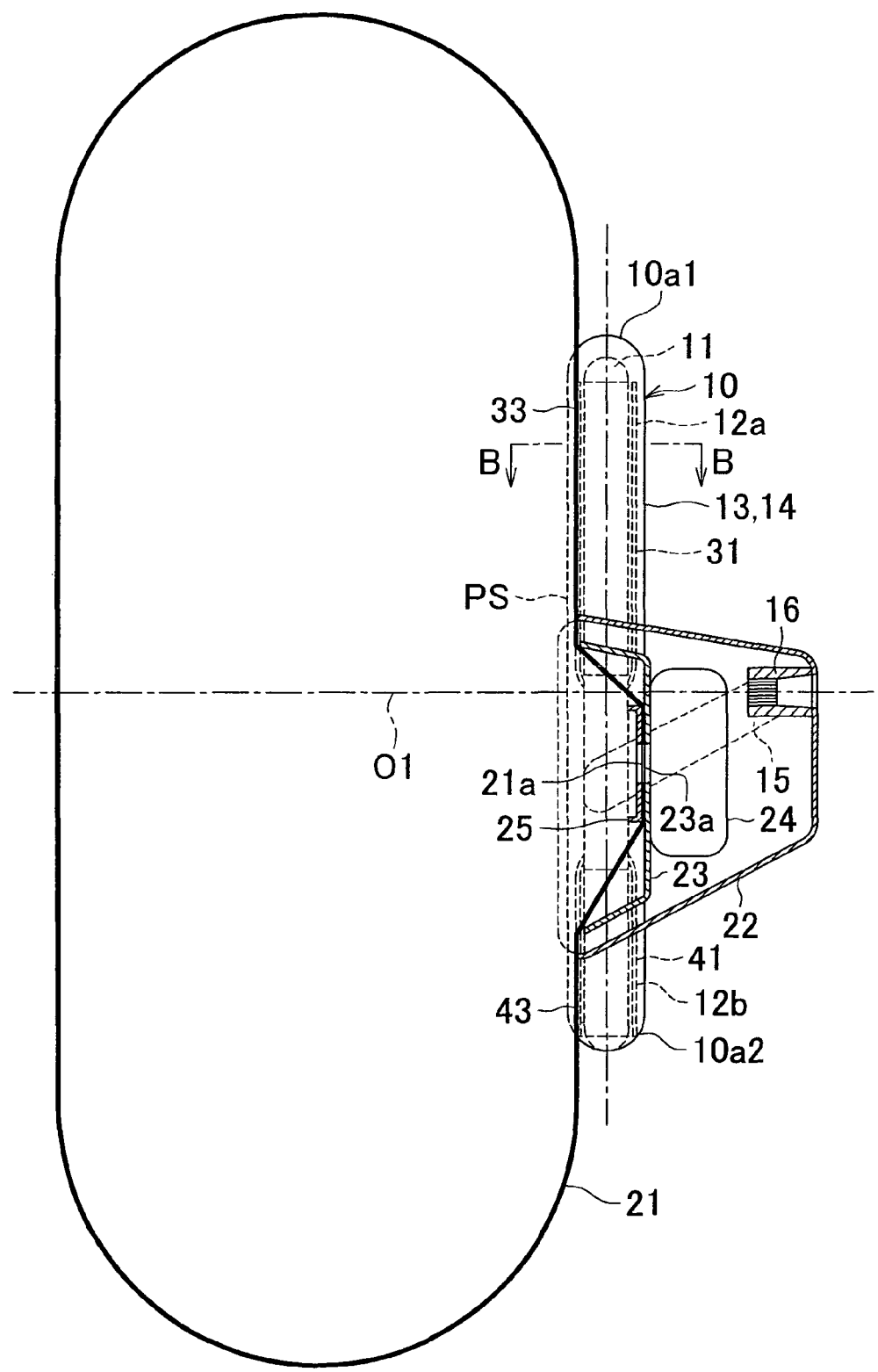
FIG. 3 is an enlarged vertical sectional side view taken along line A-A in FIG. 2.
Figure 4:
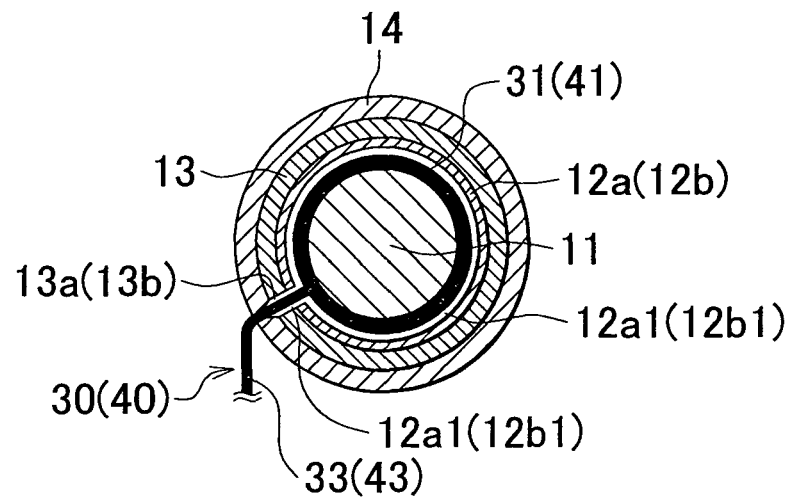
FIG. 4 is an enlarged horizontal sectional plan view taken along line B-B in FIG. 3.
Figure 5:
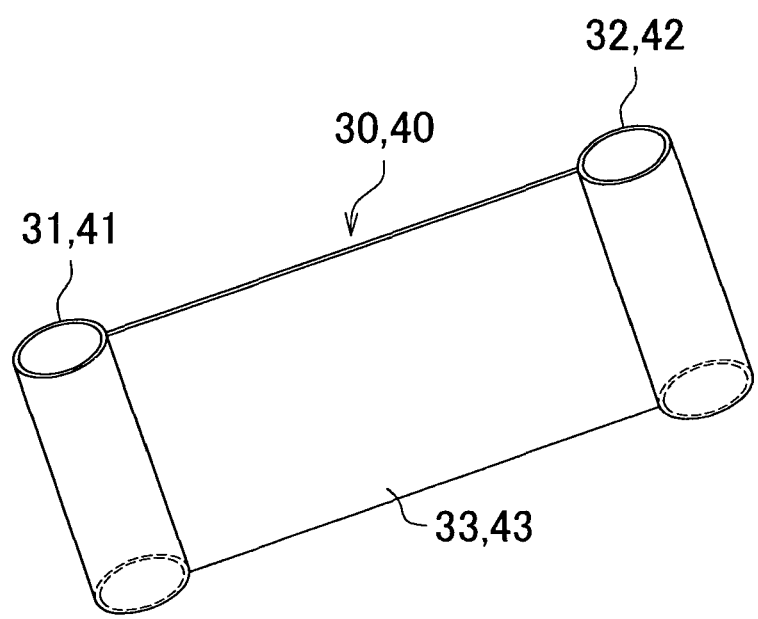
FIG. 5 is a perspective view showing a support mechanism illustrated in FIGS. 2 through 4.

Hereinafter, example embodiments of the present invention will be described with reference to the accompanying drawings. FIGS. 1 through 5 show a vehicle steering device in accordance with a first embodiment of the present invention. The vehicle steering device of the first embodiment includes a steering handle 10 and an airbag 21. As shown in FIGS. 2 and 3, the steering handle 10 is rotatable about a rotational center O1 and offset downwardly by a predetermined amount with respect to a deployed shape of the airbag 21.

Figure 1:
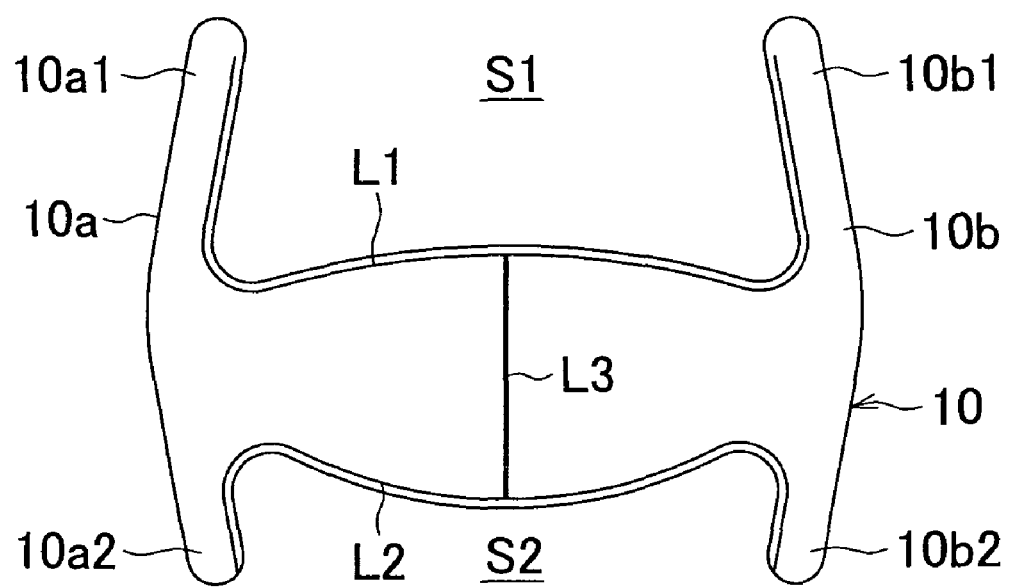
FIG. 1 is a front view showing a vehicle steering device in accordance with a first embodiment of the present invention.

The steering handle 10 includes grips 10a and 10b on the left and right sides of the steering handle 10 in a straight-ahead driving position (i.e., when positioned to have the vehicle traveling in a straight line) (as shown in, e.g., FIG. 1). While the upper and the lower sides of the steering handle 10 are defined as non-grip spaces S1 and S2, respectively. Each of the non-grip spaces S1 and S2 is a space in which no grip is provided on the steering handle 10, the non-grip spaces being provided by forming peripheral edge portions of the steering handle 10 into a non-circular shape.

The grip 10a or 10b is provided with rims 10a1 and 10a2 or 10b1 and 10b2 projecting upward and downward when the steering handle 10 is in a straight-ahead driving position. As depicted in detail in FIG. 4, each of the grips 10a and 10b includes a main core member 11, a pair of upper and lower hollow core members 12a and 12b, a pad 13 and a covering 14. The main core member 11 is connected at its middle portion to a hub 16 through a spoke 15. The hub 16 is integrally fixed to a top end of a main steering shaft (not shown).

The upper hollow core member 12a is fixedly secured at its lower end to the main core member 11 and has a slit 12a1 formed correspondingly to one of vertically extending sections of an upper tear line L1 illustrated in FIG. 1. The lower hollow core member 12b is fixedly secured at its upper end to the main core member 11 and has a slit 12b1 formed correspondingly to one of vertically extending sections of a lower tear line L2 represented in FIG. 1.

The pad 13 is provided to cover the main core member 11, the upper and lower hollow core members 12a and 12b and also to cover an opening of a housing 22 fixed to the hub 16. The pad 13 has slits 13a and 13b formed correspondingly to the slits 12a1 and 12b1 of the respective hollow core members 12a and 12b. The covering 14 is provided to cover the pad 13. Upper and lower tear lines L1 and L2 are formed in the covering 14 and a middle tear line L3 is formed to interconnect the transverse center portions of the upper and lower tear lines L1 and L2. During deployment of the airbag 21, the covering 14 is torn at the respective tear lines L1, L2 and L3 as illustrated in FIG. 2 so that the portions of the covering 14 the cover the opening of the housing 22 may be spread out to the left and right together with the pad 13. The pad 13 and the covering 14 are both formed of soft resin (the covering 14 may be made of natural leather).

As with conventional airbags, the airbag 21 is provided in the steering handle 10 and is deployed between the steering handle 10 and the driver (not shown) to restrain the driver in the event of a collision. As can be seen in FIG. 3, the airbag 21 may be stored in a collapsed state within a holder 23 of the housing 22 and may also be housed inside the housing 22 together with an inflator 24. Furthermore, the airbag 21 has an opening 21a located below the rotational center O1, around which opening 21a the airbag 21 is air-tightly fixed to the holder 23 by means of a ring plate 25. The airbag 21 is deployed from the lower side in the drawings (from the non-grip space S2).

The holder 23 has a through-hole 23a at its bottom center and is attached in place within the housing 22 through a bracket (not shown) to support the airbag 21 and the inflator 24. The inflator 24 serves to injects gas into the opening 21a of the airbag 21 via the through-hole 23a of the holder 23 in the event of a collision. The inflator 24 per se is already known in the art.

In the first embodiment, an upper support mechanism 30 and a lower support mechanism 40 are provided in the steering handle 10. The upper support mechanism 30 is provided in a corresponding relationship with the upper non-grip space S1 and is movable upwardly. The lower support mechanism 40 is provided in a corresponding relationship with the lower non-grip space S2 and is movable downwardly. The upward displacement amount of the upper support mechanism 30 is set greater than the downward displacement amount of the lower support mechanism 40.

Referring to FIGS. 2 through 5, each of the support mechanisms 30 and 40 includes a pair of left and right fabric sleeves 31 and 32 or 41 and 42 capable of retracting and extending along the main core member 11 of the steering handle 10 and a rectangular tension fabric 33 or 43 sewn at its short-side ends to the flank portions of the fabric sleeves 31 and 32 or 41 and 42, the tension fabric 33 or 43 being capable of retracting and extending together with the fabric sleeves 31 and 32 or 41 and 42.

Each of the fabric sleeves 31 and 32 or 41 and 42 serves as an engagement portion attached to the main core member 11 of the steering handle 10 in a retactable and extendable manner. Each of the fabric sleeves 31 and 32 or 41 and 42 is kept retracted in the state as shown in FIG. 1 (a state that the steering handle 10 is in normal use, with the airbag 21 collapsed and stored inside the steering handle 10) but is extended along the main core member 11 in the state as illustrated in FIGS. 2 and 3 (a state in which the vehicle is in collision, with the airbag 21 deployed as indicated by an imaginary line in FIG. 2).

The rectangular tension fabric 33 or 43 is fixedly secured to a rear surface of the deployed airbag 21 at the portions indicated by symbol "X" in FIG. 2. In the state as shown in FIG. 1, the rectangular tension fabric 33 or 43 is collapsed together with the airbag 21 and stored in a stowed position within the steering handle 10. In the event of a vehicle collision, the rectangular tension fabric 33 or 43 is moved to an operative position (deployment position) as depicted in FIGS. 2 and 3 with the deployment of the airbag 21 and is taughtly stretched between the rims 10a1 and 10b1 or 10a2 and 10b2. When extended, the rectangular tension fabrics 33 and 43 support the rear surface of the deployed airbag 21 in the non-grip spaces S1 and S2, respectively. Alternatively, the tension fabric 33 or 43 may be formed of a sub-airbag capable of being inflated and deployed by the gas supplied to the airbag 21.

As is apparent from the configuration set forth above, in the event of a collision, each of the support mechanisms 30 and 40 is moved from the stowed position to the operative position (deployment position) on a vehicle's forward side from a reference plane PS (see FIG. 3), including a rotating trajectory of the portion of the steering handle 10 (the portion shown in FIG. 1) that normally faces the driver. That is to say, each of the support mechanisms 30 and 40 is moved from the stowed position to the operative position along a trajectory that does not project from the reference plane PS toward the rear of the vehicle. When the support mechanisms 30 and 40 are in the respective operative positions, the rectangular tension fabrics 33 and 43 to support the rear surface of the deployed airbag 21 in the non-grip spaces S1 and S2.

Consequently, in the first embodiment, it is possible for each of the support mechanisms 30 and 40 to effectively withstand the reaction force generated when the airbag 21 restrains the driver and it is also possible for the airbag 21 to reliably restrain the driver. Furthermore, in the first embodiment, it is possible to prevent constituent parts of each of the support mechanisms 30 and 40 from contacting the driver during their movement. This is because each of the support mechanisms 30 and 40 is moved from the stowed position within the steering handle 10 to the operative position on the vehicle's forward side from the reference plane PS including the rotating trajectory of the portion of the steering handle 10 normally facing the driver, namely because each of the support mechanisms 30 and 40 can be moved from the home position to the operative position along a trajectory that does not project from the reference plane PS toward the rear of the vehicle.

In the first embodiment, each of the support mechanisms 30 and 40 may be simple structures and may be provided in a cost-effective manner. This is because each of the support mechanisms 30 and 40 includes the fabric sleeves 31 and 32 or 41 and 42 that are capable of retracting and extending along the main core member 11 of the steering handle 10 and the rectangular tension fabric 33 or 43 sewn at its short-side ends to the flank portions of the fabric sleeves 31 and 32 or 41 and 42 and adapted to be taughtly stretched between the rims 10a1 and 10b1 or 10a2 and 10b2.

In the first embodiment, the support mechanisms 30 and 40 do not actuators for their operation and may therefore be provided in a cost-effective manner. This is because the rectangular tension fabric 33 or 43 is partly fixed to the airbag 21 so that each of the support mechanisms 30 and 40 moves to the operative position in response to deployment of the airbag 21.

In the first embodiment, it is possible to reliably support the rear surface of the deployed airbag 21. This is possible because the steering handle 10 having the non-grip spaces S1 and S2 on the upper and lower sides thereof as shown in FIG. 1 remains downwardly offset by a predetermined amount with respect to the deployed shape of the airbag 21 and also because the upward displacement amount of the upper support mechanism 30 is set greater than the downward displacement amount of the lower support mechanism 40.

In the first embodiment, when the steering handle 10 is positioned to drive the vehicle straight, the opening 21a of the airbag 21 is located below the rotational center O1 of the steering handle 10. The airbag 21 is deployed from the lower side. The lower support mechanism 40 is set to move toward its operative position before the upper support mechanism 30. This ensures that the lower support mechanism 40, which is arranged closer to the driver than the upper support mechanism 30, moves to its operative position before movement of the upper support mechanism 30 is initiated. Therefore, as compared to a case where the upper and lower support mechanisms 30 and 40 are simultaneously moved, it is possible to reduce the possibility of interference (collision) which would occur between the lower support mechanism 40 and the driver.

Although the support mechanism 30 or 40 includes the left and right fabric sleeves 31 and 32 or 41 and 42 and the rectangular tension fabric 33 or 43 in the first embodiment, the rectangular tension fabric 33 or 43 may be replaced with a portion of the airbag 21. That is to say, it may be possible to eliminate the rectangular tension fabric 33 or 43 and to sew the left and right fabric sleeves 31 and 32 or 41 and 42 to pertinent portions of the airbag 21. In this case, the portions of the airbag 21 thus sewn act like the rectangular tension fabric 33 or 43, thus making it possible to effectively utilize the airbag 21.

Figure 6:
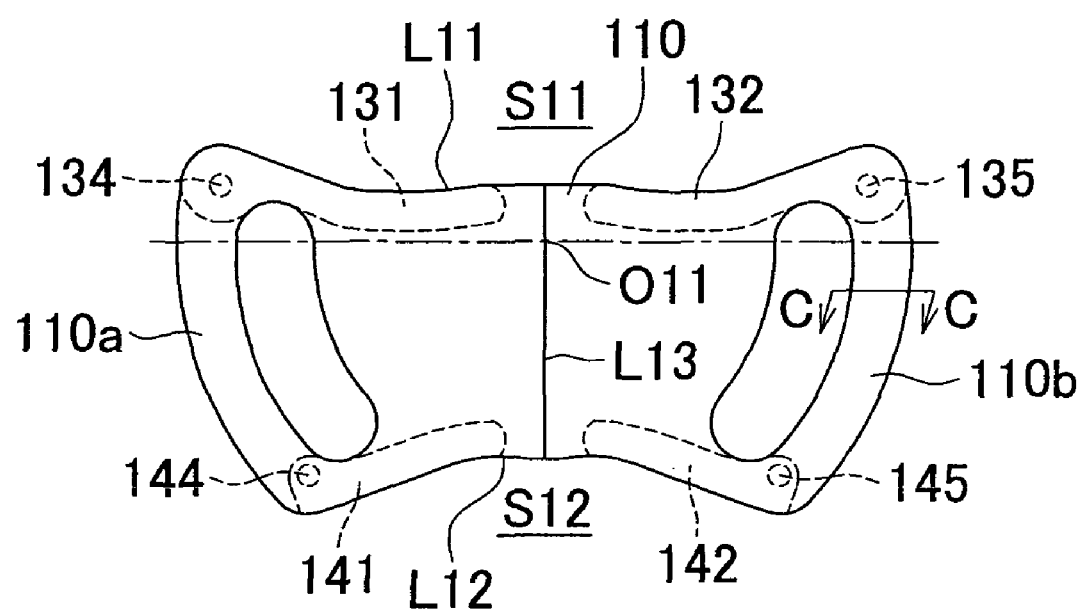
FIG. 6 is a front view showing a vehicle steering device in accordance with a second embodiment of the present invention.
Figure 7:
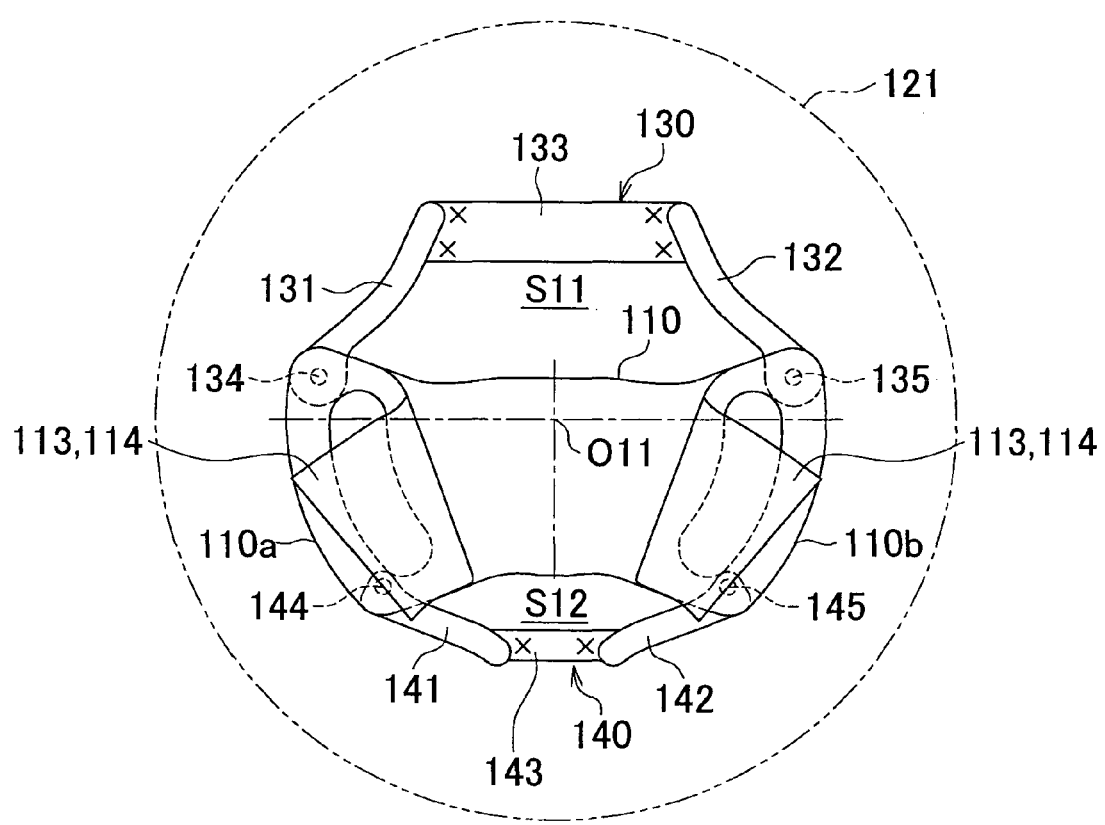
FIG. 7 is a view for explaining an operation of the second embodiment shown in FIG. 6.
Figure 8:
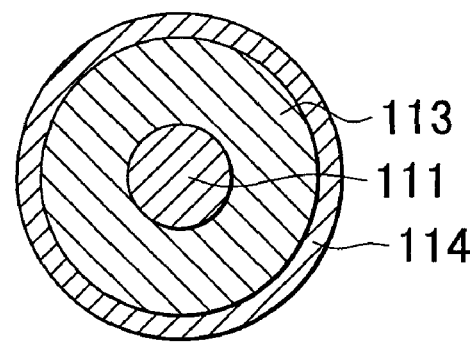
FIG. 8 is an enlarged horizontal sectional plan view taken along line C-C in FIG. 6.

FIGS. 6 through 8 show a vehicle steering device in accordance with a second embodiment of the present invention. The vehicle steering device of the second embodiment includes a steering handle 110 and an airbag 121. The steering handle 110 is rotatable about a rotational center O11 and is downwardly offset by a predetermined amount with respect to a deployed shape of the airbag 121 indicated by an imaginary line.

The steering handle 110 includes grips 110a and 110b on the left and right sides of the steering handle 110 in a straight-ahead driving position (the state shown in, e.g., FIG. 6). Non-grip spaces S11 and S12 are formed on the upper and lower sides of the steering handle 110. Each of the non-grip spaces S11 and S12 is a space in which no grip is provided on the steering handle 110, and is provided by forming peripheral edge portions of the steering handle 110 into a non-circular shape.

Each of the grips 110a and 110b is in the form of an arcuate rim and includes a core member 111, a pad 113 and a covering 114 as illustrated in FIG. 8. The core member 111 is connected at its upper and lower end portions to a hub (not shown) through spokes (not shown). Like the hub 16 of the first embodiment shown in FIG. 3, the hub of the present embodiment is integrally fixed in a well-known manner to a top end of a main steering shaft (not shown).

The pad 113 is provided to cover the core member 111 and also to cover an opening of a housing fixed to the hub (not shown), the housing of the present embodiment having the same configuration as the housing 22 of the first embodiment shown in FIG. 3. The pad 113 has slits (not shown) formed in its regions corresponding to an upper tear line L11, a lower tear line L12 and a middle tear line L13 of the covering 114. The pad 113 and the covering 114 could be made of soft resin or the like.

As with conventional airbags, the airbag 121 is provided in the steering handle 110 and is deployed between the steering handle 110 and the driver (not shown) to restrain the driver in the event of a collision. As with the first embodiment shown in FIG. 3, the airbag 121 may be stored in a collapsed state within a holder of the housing in a collapsed state and may also be housed inside the housing together with an inflator. Furthermore, the airbag 121 has an opening (not shown) located below the rotational center O11, around which opening the airbag 121 is air-tightly fixed to the holder by means of a ring plate as is the case in the first embodiment shown in FIG. 3. The airbag 121 is deployed from the lower side in the drawings.

In the second embodiment, an upper support mechanism 130 and a lower support mechanism 140 are provided in the steering handle 110. The upper support mechanism 130 is provided in a corresponding relationship with the upper non-grip space S11 and is movable upwardly. The lower support mechanism 140 is provided in a corresponding relationship with the lower non-grip space S12 and is movable downwardly. The upward displacement amount of the upper support mechanism 130 is set greater than the downward displacement amount of the lower support mechanism 140.

Referring to FIGS. 6 and 7, each of the support mechanisms 130 and 140 includes a pair of left and right reaction force supporting arms 131 and 132 or 141 and 142 and a tension cloth (tension member) 133 or 143 fixed at its lateral end portions to the distal end portions of the reaction force supporting arms 131 and 132 or 141 and 142, the tension cloth 133 or 143 being adapted to be taughtly stretched in the non-grip space S11 or S12.

The upper reaction force supporting arms 131 and 132 are rotatably attached to the core members 111 of the steering handle 110 through pins 134 and 135, respectively. In the state as shown in FIG. 6 (a state that the steering handle 110 is in normal use, with the airbag 121 collapsed and stored inside the steering handle 110), the upper reaction force supporting arms 131 and 132 are housed within the steering handle 110 together with the tension cloth 133. In the state as illustrated in FIG. 7 (a vehicle collision state in which the airbag 121 is deployed as indicated by the imaginary line), the upper reaction force supporting arms 131 and 132 are allowed to rotate toward the non-grip space S11 and the tension cloth 133 is taughtly stretched in the non-grip space S11.

The lower reaction force supporting arms 141 and 142 are rotatably attached to the core members 111 of the steering handle 110 through pins 144 and 145, respectively. In the state as shown in FIG. 6 (a state that the steering handle 110 is in normal use, with the airbag 121 collapsed and stored inside the steering handle 110), the lower reaction force supporting arms 141 and 142 are received within the steering handle 110 together with the tension cloth 143. In the state as illustrated in FIG. 7 (a vehicle collision state in which the airbag 121 is deployed as indicated by the imaginary line), the lower reaction force supporting arms 141 and 142 are allowed to rotate, toward the non-grip space S12 and the tension cloth 143 is taughtly stretched in the non-grip space S12.

The tension cloth 133 or 143 is fixedly secured to the airbag 121 at the portions indicated by "X" in FIG. 7. In the state as shown in FIG. 6, the tension cloth 133 or 143 is collapsed together with the airbag 121 and stored in a stowed position within the steering handle 110. In the event of a collision, the tension cloth 133 or 143 is moved to an operative position as depicted in FIG. 7 with deployment of the airbag 121 and is extended and taughtly stretched between the reaction force supporting arms 131 and 132 or 141 and 142. When extended, the tension cloth 133 or 143 cooperates with the reaction force supporting arms 131 and 132 or 141 and 142 to support the rear surface of the deployed airbag 121 in the non-grip spaces S11 and S12.

In the second embodiment configured as above, it is possible to obtain the same operational effects as in the first embodiment, because each of the support mechanisms 130 and 140 has the same operation and function as that of the support mechanisms 30 and 40 employed in the first embodiment. Furthermore, in the second embodiment, the tension cloth 133 or 143 may be replaced with a portion of the airbag 121. That is, it may be possible to eliminate the tension cloths 133 and 143 and to have the airbag 121 partially fixed to the tip portions of the reaction force supporting arms 131, 132, 141 and 142. In this case, the portions of the airbag 121 thus fixed act like the tension cloth 133 or 143, thus making it possible to effectively utilize the airbag 21.

Figure 9:
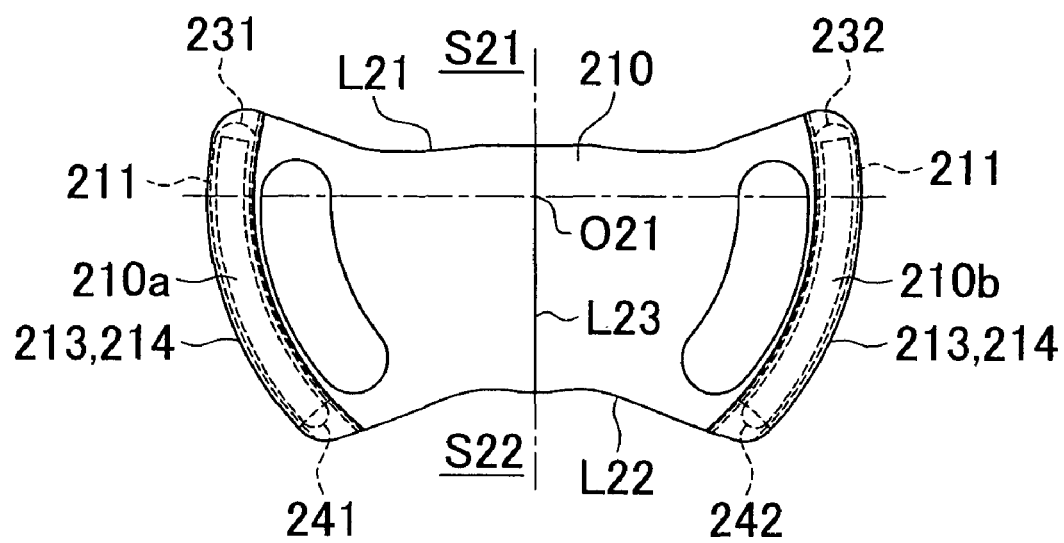
FIG. 9 is a front view showing a vehicle steering device in accordance with a third embodiment of the present invention.
Figure 10:
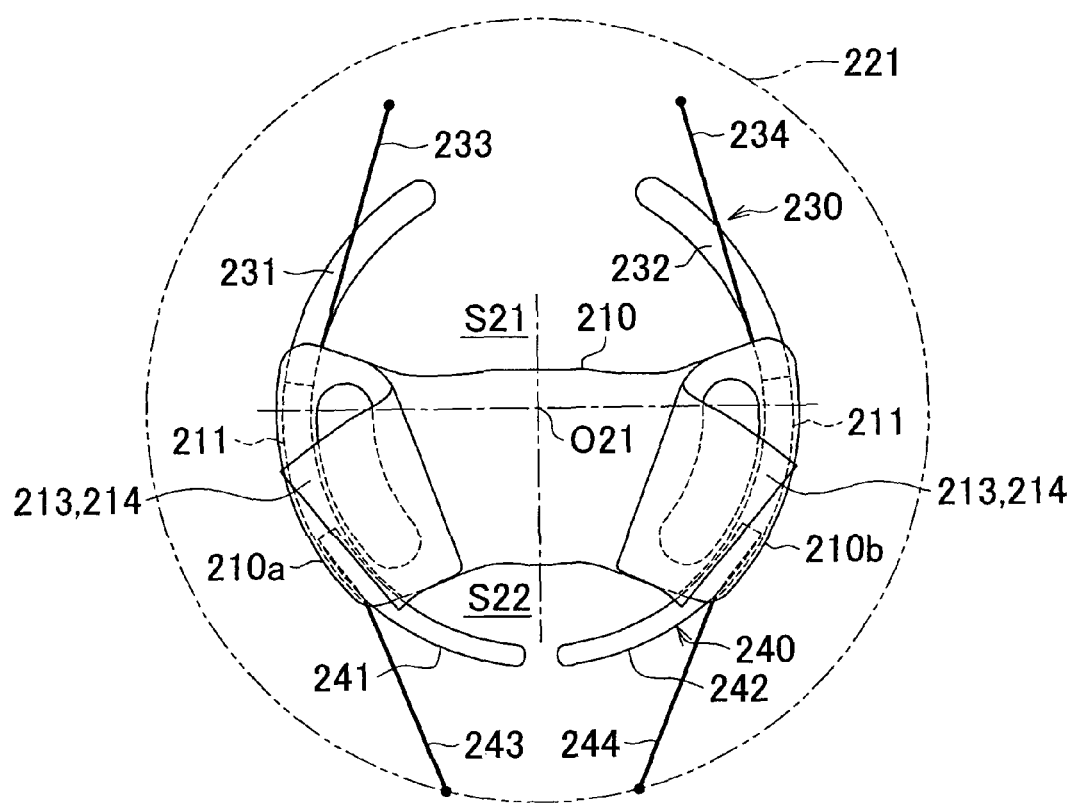
FIG. 10 is a view for explaining an operation of the third embodiment shown in FIG. 9.

FIGS. 9 and 10 show a vehicle steering device in accordance with a third embodiment of the present invention. The vehicle steering device of the third embodiment includes a steering handle 210 and an airbag 221. The steering handle 210 is rotatable about a rotational center O21 and remains downwardly offset by a predetermined amount with respect to a deployed shape of the airbag 221 indicated by an imaginary line.

The steering handle 210 includes grips 210a and 210b on the left and right sides of the steering handle 210 in the straight-ahead driving position (as shown in, e.g., FIG. 9). Non-grip spaces S21 and S22 are formed on the upper and lower sides of the steering handle 210. Each of the non-grip spaces S21 and S22 is a space in which has no grip is provided on the steering handle 210, and is provided by forming peripheral edge portions of the steering handle 210 into a non-circular shape.

Each of the grips 210a and 210b is in the form of an arcuate rim and includes a hollow core member 211, a pad 213 and a covering 214. The pad 213 and the covering 214 have the same configuration as the pad 113 and the covering 114 employed in the second embodiment. The hollow core member 211 is connected at its upper and lower ends to a hub (not shown) through spokes (not shown). Like the hub 16 of the first embodiment shown in FIG. 3, the hub of the present embodiment is integrally fixed in a well-known manner to a top end of a main steering shaft (not shown).

As with conventional airbags, the airbag 221 is provided in the steering handle 210 and is deployed between the steering handle 210 and the driver (not shown) to restrain the driver in the event of a collision. As with the first embodiment shown in FIG. 3, the airbag 221 may be stored in a collapsed state within a holder of a housing and may also be housed inside the housing together with an inflator. Furthermore, the airbag 221 has an opening (not shown) located below the rotational center O21, around which opening the airbag 221 is air-tightly fixed to the holder by means of a ring plate as is the case in the first embodiment shown in FIG. 3. The airbag 221 is deployed from the lower side. In the present embodiment, the pad 213 and the covering 214 are provided to cover the opening of the housing. Three tear lines L21, L22 and L23 are formed in the covering 214, as in the first embodiment shown in FIG. 3.

In the third embodiment, an upper support mechanism 230 and a lower support mechanism 240 are provided in the steering handle 210. The upper support mechanism 230 is provided in a corresponding relationship with the upper non-grip space S21 and is movable upwardly. The lower support mechanism 240 is provided in a corresponding relationship with the lower non-grip space S22 and is movable downwardly. The upward displacement amount of the upper support mechanism 230 is set greater than the downward displacement amount of the lower support mechanism 240.

Referring to FIGS. 9 and 10, each of the support mechanisms 230 and 240 includes a pair of left and right reaction force supporting arms 231 and 232 or 241 and 242 fitted into the hollow core members 211 of the steering handle 210 and linking strings 233 and 234 or 243 and 244 connected to the base ends of the reaction force supporting arms 231 and 232 or 241 and 242 and also to the pertinent portions of the airbag 221.

The upper reaction force supporting arms 231 and 232 are in the form of a hollow body and are fitted into the hollow core members 211 of the steering handle 210 in an extendable and retractable manner. In the state as shown in FIG. 9 (a state that the steering handle 210 is in normal use, with the airbag 221 collapsed and stored inside the steering handle 210), the upper reaction force supporting arms 231 and 232 are received within the steering handle 210 together with the respective linking strings 233 and 234. In the state as illustrated in FIG. 10 (a vehicle collision state in which the airbag 221 is deployed as indicated by the imaginary line), the upper reaction force supporting arms 231 and 232 are pulled out to the non-grip space S21 by means of the linking strings 233 and 234 so that they support the rear surface of the deployed airbag 221 in the non-grip space S21.

The lower reaction force supporting arms 241 and 242 are in the form of a solid body and are fitted into the upper reaction force supporting arms 231 and 232 within the hollow core members 211 of the steering handle 210 in an extendable and retractable manner. In the state as shown in FIG. 9 (a state that the steering handle 210 is in normal use, with the airbag 221 collapsed and stored inside the steering handle 210), the lower reaction force supporting arms 241 and 242 are received within the steering handle 210 together with the respective linking strings 243 and 244. In the state as illustrated in FIG. 10 (a vehicle collision state in which the airbag 221 is deployed as indicated by the imaginary line), the lower reaction force supporting arms 241 and 242 are pulled out to the non-grip space S22 by means of the linking strings 243 and 244 so that they support the rear surface of the deployed airbag 221 in the non-grip space S22.

The upper linking strings 233 and 234 are fixed at one end to the lower ends of the upper reaction force supporting arms 231 and 232 and at the other end to the pertinent portions of the airbag 221 being deployed toward the non-grip space S21. In the state as shown in FIG. 9, the upper linking strings 233 and 234 are collapsed together with the airbag 221 and stored in a stowed position inside the steering handle 210. In the event of a collision, the upper linking strings 233 and 234 extend to an operative position with the deployment of the airbag 221 as illustrated in FIG. 10, thereby pulling out the upper reaction force supporting arms 231 and 232 into the upper non-grip space S21.

The lower linking strings 243 and 244 are fixed at one end to the upper ends of the lower reaction force supporting arms 241 and 242 and at the other end to the appropriate portions of the airbag 221 that are deployed toward the non-grip space S22. In the state as shown in FIG. 9, the lower linking strings 243 and 244 are collapsed together with the airbag 221 and stored in a stowed position inside the steering handle 210. In the event of a collision, the lower linking strings 243 and 244 are extended to an operative position with the deployment of the airbag 221 as illustrated in FIG. 10, thereby pulling out the lower reaction force supporting arms 241 and 242 to the lower non-grip space S22.

In the third embodiment configured as above, it is possible to obtain the same operational effects as in the first and second embodiments, because each of the support mechanisms 230 and 240 has the same operation and function as that of the support mechanisms 30 and 40 employed in the first embodiment and the support mechanisms 130 and 140 employed in the second embodiment.

Figure 11:
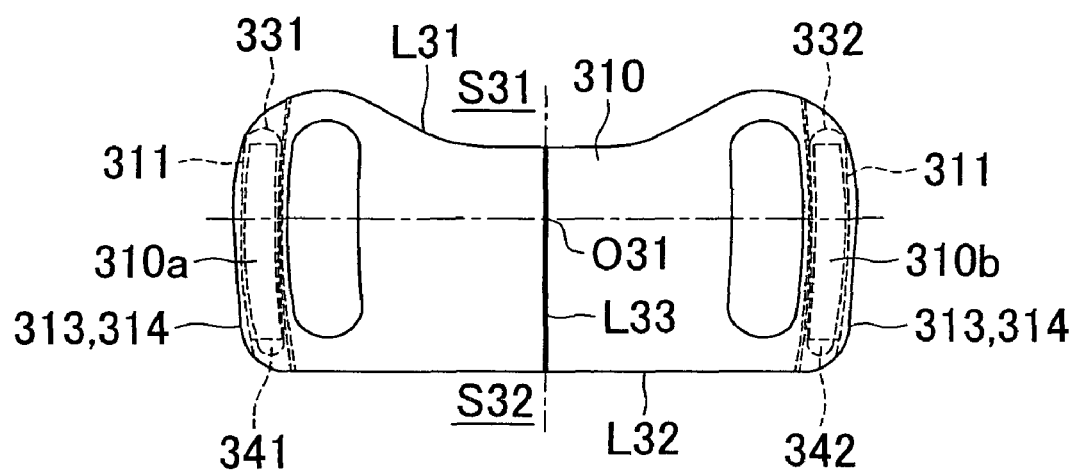
FIG. 11 is a front view showing a vehicle steering device in accordance with a fourth embodiment of the present invention.

FIGS. 11 and 12 show a vehicle steering device in accordance with a fourth embodiment of the present invention. The vehicle steering device of the fourth embodiment includes a steering handle 310 and an airbag 321. The steering handle 310 is rotatable about a rotational center O31 and remains downwardly offset by a predetermined amount with respect to a deployed shape of the airbag 321 indicated by an imaginary line.

The steering handle 310 includes grips 310a and 310b on the left and right sides of the steering handle 310 in a straight-ahead driving position (the state shown in, e.g., FIG. 11). Non-grip spaces S31 and S32 are formed on the upper and lower sides of the steering handle 310. Each of the non-grip spaces S31 and S32 is a space in which no grip is provided on the steering handle 310, and is provided by forming peripheral edge portions of the steering handle 310 into a non-circular shape.

Each of the grips 310a and 310b is in the form of an arcuate rim and includes a hollow core member 311, a pad 313 and a covering 314. The pad 313 and the covering 314 have the same configuration as the pad 113 and the covering 114 employed in the second embodiment. The hollow core member 311 is connected at its upper and lower ends to a hub (not shown) through spokes (not shown). Like the hub 16 of the first embodiment shown in FIG. 3, the hub of the present embodiment is integrally fixed in a well-known manner to a top end of a main steering shaft (not shown).

As with conventional airbags, the airbag 321 is provided in the steering handle 310 and is deployed between the steering handle 310 and the driver (not shown) to restrain the driver in the event of a collision. As with the first embodiment shown in FIG. 3, the airbag 321 may be stored in a collapsed state within a holder of a housing in a collapsed state and may also be housed inside the housing together with an inflator. Furthermore, the airbag 321 has an opening (not shown) located below the rotational center O31, around which opening the airbag 321 is air-tightly fixed to the holder by means of a ring plate as is the case in the first embodiment shown in FIG. 3. The airbag 321 is deployed from the lower side. In the present embodiment, the pad 313 and the covering 314 are provided to cover the opening of the housing and three tear lines L31, L32 and L33 are formed in the covering 314, as in the first embodiment shown in FIG. 3.

In the fourth embodiment, an upper support mechanism 330 and a lower support mechanism 340 are provided in the steering handle 310. The upper support mechanism 330 is provided in a corresponding relationship with the upper non-grip space S31 and is movable upwardly. The lower support mechanism 340 is provided in a corresponding relationship with the lower non-grip space S32 and is movable downwardly. The upward displacement amount of the upper support mechanism 330 is set greater than the downward displacement amount of the lower support mechanism 340.

Referring to FIGS. 11 and 12, each of the support mechanisms 330 and 340 includes a pair of left and right reaction force supporting arms 331 and 332 or 341 and 342 fitted into the hollow core members 311 of the steering handle 310 and a tension cloth (tension member) 333 or 343 fixed at its lateral end portions to the distal end portions of the reaction force supporting arms 331 and 332 or 341 and 342, the tension cloth 333 or 343 adapted to be taughtly stretched in the non-grip space S31 or S32.

The upper reaction force supporting arms 331 and 332 are in the form of a hollow body and are fitted into the hollow core members 311 of the steering handle 310 in an extendable and retractable manner. In the state as shown in FIG. 11 (a state that the steering handle 310 is in normal use, with the airbag 321 collapsed and stored inside the steering handle 310), the upper reaction force supporting arms 331 and 332 are received within the steering handle 310 together with the tension cloth 333. In the state as illustrated in FIG. 12 (a vehicle collision state in which the airbag 321 is deployed as indicated by the imaginary line), the upper reaction force supporting arms 331 and 332 are pulled out into the non-grip space S31 by means of the tension cloth 333 so that they can cooperate with the tension cloth 333 to support the rear surface of the deployed airbag 321 in the non-grip space S31.

The lower reaction force supporting arms 341 and 342 are in the form of a solid body and are fitted into the upper reaction force supporting arms 331 and 332 within the hollow core members 311 of the steering handle 310 in an extendable and retractable manner. In the state as shown in FIG. 11 (a state that the steering handle 310 is in normal use, with the airbag 321 collapsed and stored inside the steering handle 310), the lower reaction force supporting arms 341 and 342 are received within the steering handle 310 together with the tension cloth 343. In the state as illustrated in FIG. 12 (a vehicle collision state in which the airbag 321 is deployed as indicated by the imaginary line), the lower reaction force supporting arms 341 and 342 are pulled out into the non-grip space S32 by means of the tension cloth 343 so that they can cooperate with the tension cloth 343 to support the rear surface of the deployed airbag 321 in the non-grip space S32.

The upper tension cloth 333 includes fabric sleeves 333a and 333b that are fitted to the distal end portion of the left and right reaction force supporting arms 331 and 332, respectively, in an extendable and retractable manner. The top ends of the fabric sleeves 333a and 333b are respectively fixed to the tips of the left and right reaction force supporting arms 331 and 332. A rectangular fabric 333c sewn at its short-side ends to the fabric sleeves 333a and 333b and may extend and retract together with the fabric sleeves 333a and 333b. The rectangular fabric 333c is fixed to the airbag 321 at the portions indicated by "X" in FIG. 12.

The lower tension cloth 343 includes fabric sleeves 343a and 343b fitted to the distal end portions of the left and right reaction force supporting arms 341 and 342, respectively, in an extendable and retractable manner. The bottom ends of the fabric sleeves 343a and 343b are respectively fixed to the tips of the left and right reaction force supporting arms 341 and 342. A rectangular fabric 343c sewn at its short-side ends to the fabric sleeves 343a and 343b and may extend and retract together with the fabric sleeves 343a and 343b. The rectangular fabric 343c is fixed to the airbag 321 at the portions indicated by "X" in FIG. 12.

In the fourth embodiment configured as above, it is possible to obtain the same operational effects as are available in the first embodiment, because each of the support mechanisms 330 and 340 has the same operation and function as that of the support mechanisms 30 and 40 employed in the first embodiment.

Figure 13:
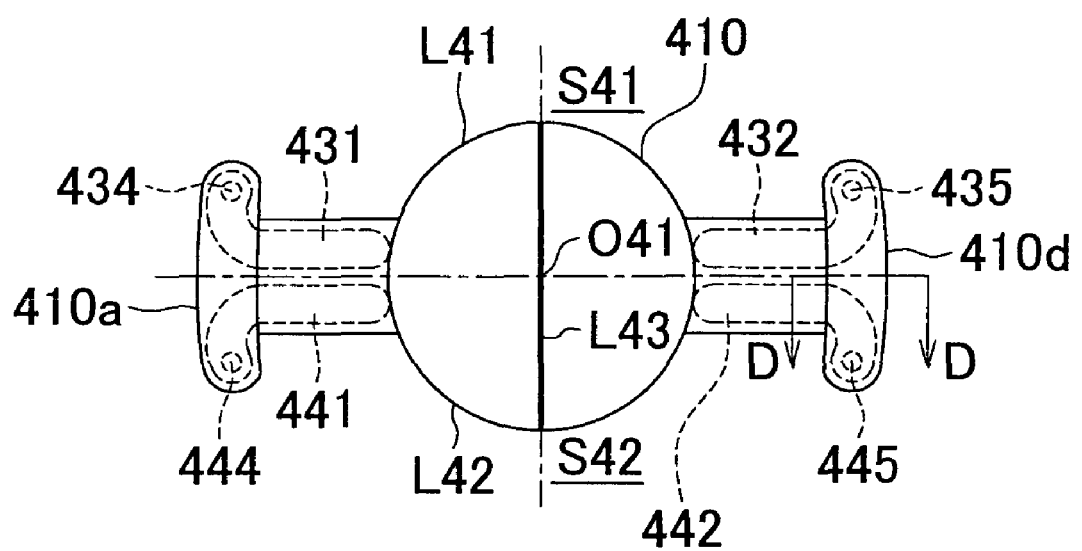
FIG. 13 is a front view showing a vehicle steering device in accordance with a fifth embodiment of the present invention.
Figure 14:
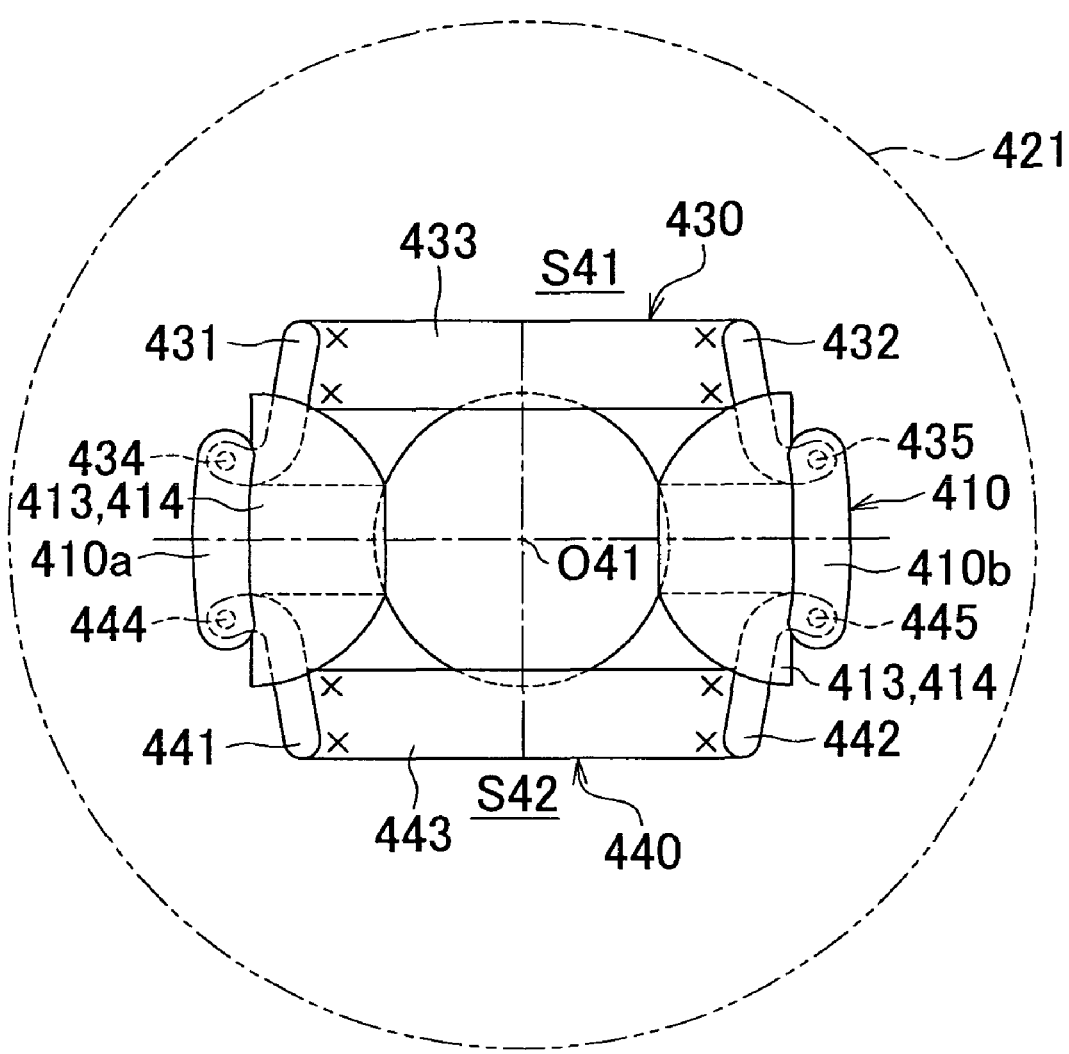
FIG. 14 is a view for explaining an operation of the fifth embodiment shown in FIG. 13.
Figure 15:
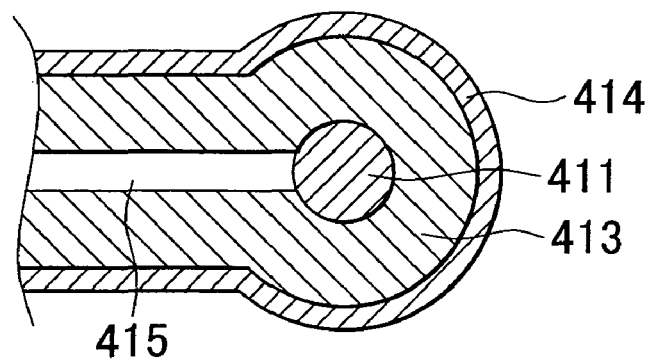
FIG. 15 is an enlarged horizontal sectional plan view taken along line D-D in FIG. 13.

FIGS. 13 through 15 show a vehicle steering device in accordance with a fifth embodiment of the present invention. The vehicle steering device of the fifth embodiment includes a steering handle 410 and an airbag 421. The steering handle 410 is rotatable about a rotational center O41 and is arranged concentrically with respect to a deployed shape of the airbag 421 indicated by an imaginary line.

The steering handle 410 includes grips 410a and 410b on the left and right sides of the steering handle 410 in a straight-ahead driving position (as shown in FIG. 13). Non-grip spaces S41 and S42 are formed on the upper and lower sides of the steering handle 410. Each of the non-grip spaces S41 and S42 is a space in which no grip is provided on the steering handle 410, and is provided by forming peripheral edge portions of the steering handle 410 into a non-circular shape.

Each of the grips 410a and 410b is in the form of a generally straight rim and includes a core member 411, a pad 413 and a covering 414, as shown in FIG. 15. The core member 411 is connected at its middle portion to a hub (not shown) through a spoke 415. As with the hub 16 of the first embodiment shown in FIG. 3, the hub of the present embodiment is integrally fixed in a well-known manner to a top end of a main steering shaft (not shown).

The pad 413 covers the core member 411 and the opening of a housing fixed to the hub, as in the first embodiment shown in FIG. 3. The pad 413 has slits (not shown) formed in its regions corresponding to an upper tear line L41, a lower tear line L42 and a middle tear line L43 of the covering 414. The pad 413 and the covering 414 are both made of soft resin or the like.

As with conventional airbags, the airbag 421 is provided in the steering handle 410 and is deployed between the steering handle 410 and the driver (not shown) to restrain the driver in the event of a collision. As in the first embodiment shown in FIG. 3, the airbag 421 may be stored in a collapsed state within a holder of a housing and may also be housed inside the housing together with an inflator. Furthermore, the airbag 421 has an opening (not shown) provided concentrically with the rotational center O41, around which opening the airbag 421 is air-tightly fixed to the holder by means of a ring plate as is the case in the first embodiment shown in FIG. 3. The airbag 421 is deployed from the center portion in the drawings.

In the fifth embodiment, an upper support mechanism 430 and a lower support mechanism 440 are provided in the steering handle 410. The upper support mechanism 430 is provided in a corresponding relationship with the upper non-grip space S41 and is movable upwardly. The lower support mechanism 440 is provided in a corresponding relationship with the lower non-grip space S42 and is movable downwardly. The upward displacement amount of the upper support mechanism 430 is set substantially equal to the downward displacement amount of the lower support mechanism 440.

Referring to FIGS. 13 and 14, each of the support mechanisms 430 and 440 includes a pair of left and right reaction force supporting arms 431 and 432 or 441 and 442 rotatably attached to the core members 411 of the steering handle 410 and a tension cloth (tension member) 433 or 443 fixed at its lateral end portions to the distal end portions of the reaction force supporting arms 431 and 432 or 441 and 442, the tension cloth 433 or 443 adapted to be taughtly stretched in the non-grip space S41 or S42.

The upper reaction force supporting arms 431 and 432 are rotatably attached to the core members 411 of the steering handle 410 through pins 434 and 435, respectively. In the state as shown in FIG. 13 (a state that the steering handle 410 is in normal use, with the airbag 421 collapsed and stored inside the steering handle 410), the upper reaction force supporting arms 431 and 432 are received within the steering handle 410 together with the tension cloth 433. In the state as illustrated in FIG. 14 (a vehicle collision state in which the airbag 421 is deployed as indicated by the imaginary line), the upper reaction force supporting arms 431 and 432 are allowed to rotate toward the non-grip space S41 and the tension cloth 433 can be taughtly stretched in the non-grip space S41.

The lower reaction force supporting arms 441 and 442 are rotatably attached to the core members 411 of the steering handle 410 through pins 444 and 445, respectively. In the state as shown in FIG. 13 (a state that the steering handle 410 is in normal use, with the airbag 421 collapsed and stored inside the steering handle 410), the lower reaction force supporting arms 441 and 442 are received within the steering handle 410 together with the tension cloth 443. In the state as illustrated in FIG. 14 (a vehicle collision state in which the airbag 421 is deployed as indicated by the imaginary line), the lower reaction force supporting arms 441 and 442 are allowed to rotate toward the non-grip space S42 and the tension cloth 443 can be taughtly stretched in the non-grip space S42.

The tension cloth 433 or 443 is fixedly secured to the airbag 421 at its portions indicated by "X" in FIG. 14. In the state as shown in FIG. 13, the tension cloth 433 or 443 is collapsed together with the airbag 421 and stored in a stowed position within the steering handle 410. In the event of a collision, the tension cloth 433 or 443 is moved to an operative position as depicted in FIG. 14 with deployment of the airbag 421 and is extended and taughtly stretched between the reaction force supporting arms 431 and 432 or 441 and 442. When extended, the tension cloth 433 or 443 cooperates with the reaction force supporting arms 431 and 432 or 441 and 442 to support the rear surface of the deployed airbag 421 in the non-grip space S41 or S42.

In the fifth embodiment configured as above, it is possible to obtain the same operational effects as in the second embodiment, because each of the support mechanisms 430 and 440 has the same operation and function as that of the support mechanisms 130 and 140 employed in the second embodiment. However, the operation of the fifth embodiment differs from that of the second embodiment in that the airbag 421 is deployed from the center portion and, consequently, the upper support mechanism 430 is operated almost simultaneously with the lower support mechanism 440. Furthermore, in the fifth embodiment, the tension cloth 433 or 443 may be replaced with a portion of the airbag 421. That is to say, it may be possible to eliminate the tension cloth 433 or 443 and to have the airbag 421 partially fixed to the tip portions of the reaction force supporting arms 431 and 432 or 441 and 442. In this case, the portions of the airbag 421 thus fixed act like the tension cloth 433 or 443, thus making it possible to effectively utilize the airbag 421.

Figure 16:
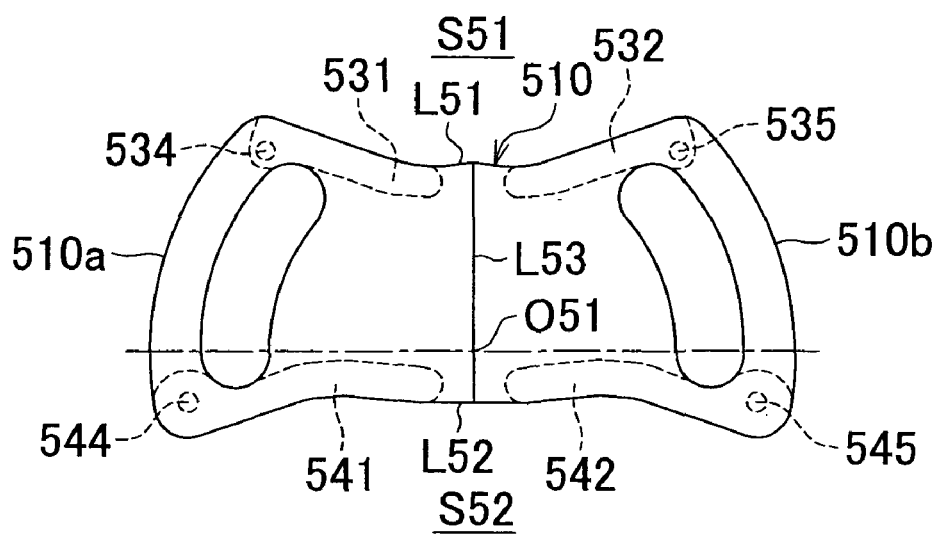
FIG. 16 is a front view showing a vehicle steering device in accordance with a sixth embodiment of the present invention.
Figure 17:
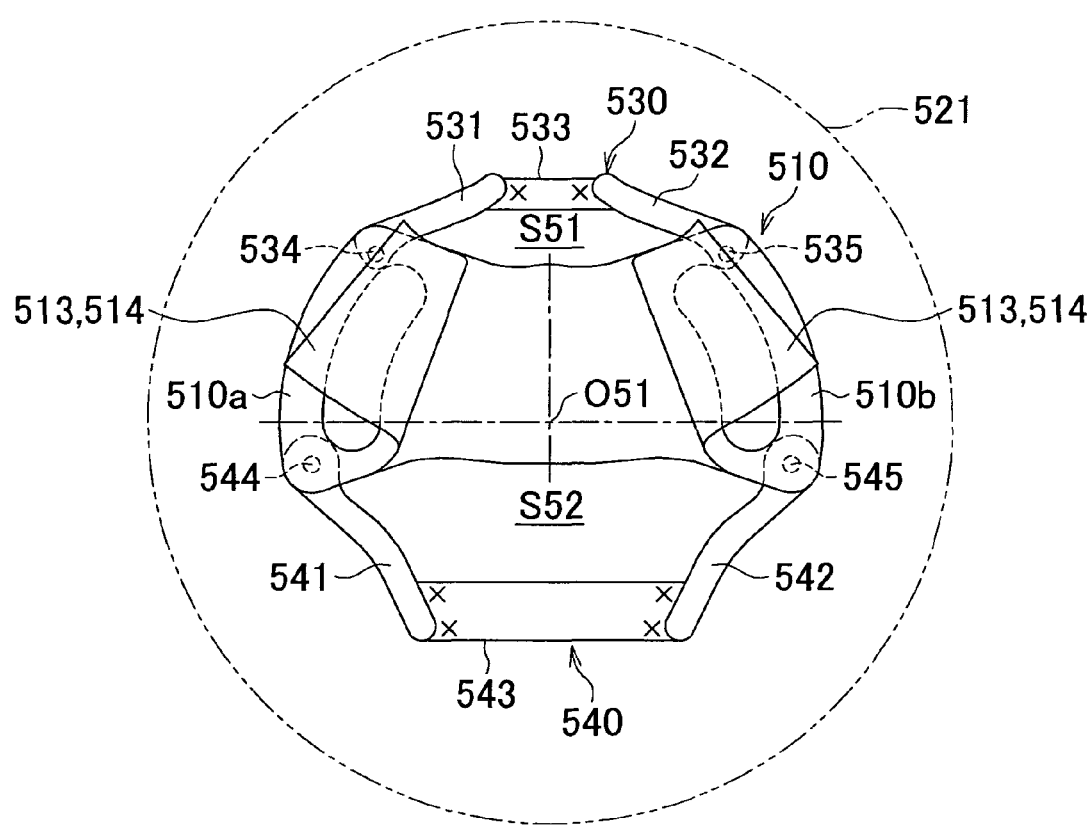
FIG. 17 is a view for explaining an operation of the sixth embodiment shown in FIG. 16.

FIGS. 16 and 17 show a vehicle steering device in accordance with a sixth embodiment of the present invention. The vehicle steering device of the sixth embodiment includes a steering handle 510 and an airbag 521. The steering handle 510 is rotatable about a rotational center O51 and remains upwardly offset by a predetermined amount with respect to a deployed shape of the airbag 521 indicated by an imaginary line.

The sixth embodiment is the same as the second embodiment shown in FIGS. 6 through 8 except that the steering handle 510 is upwardly offset by the predetermined amount with respect to the deployed shape of the airbag 521 indicated by the imaginary line. Therefore, like parts are designated by like reference numerals and description thereof will be omitted in that regard. Furthermore, the operational effects of the sixth embodiment is substantially the same as those of the second embodiment except that an upper support mechanism 530 is moved toward an operative position prior to movement of a lower support mechanism 540. Accordingly, description will be omitted in respect of the operational effects of the sixth embodiment.

Figure 18:
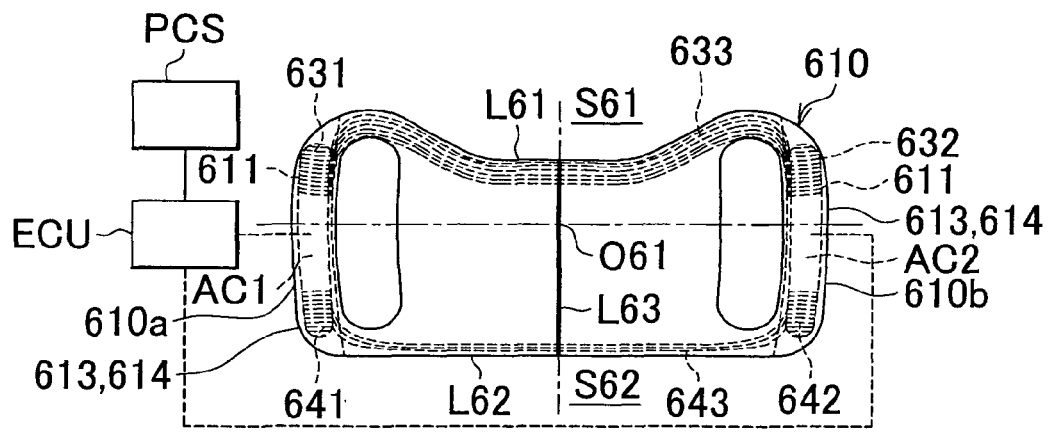
FIG. 18 is a front view showing a vehicle steering device in accordance with a seventh embodiment of the present invention.
Figure 19:
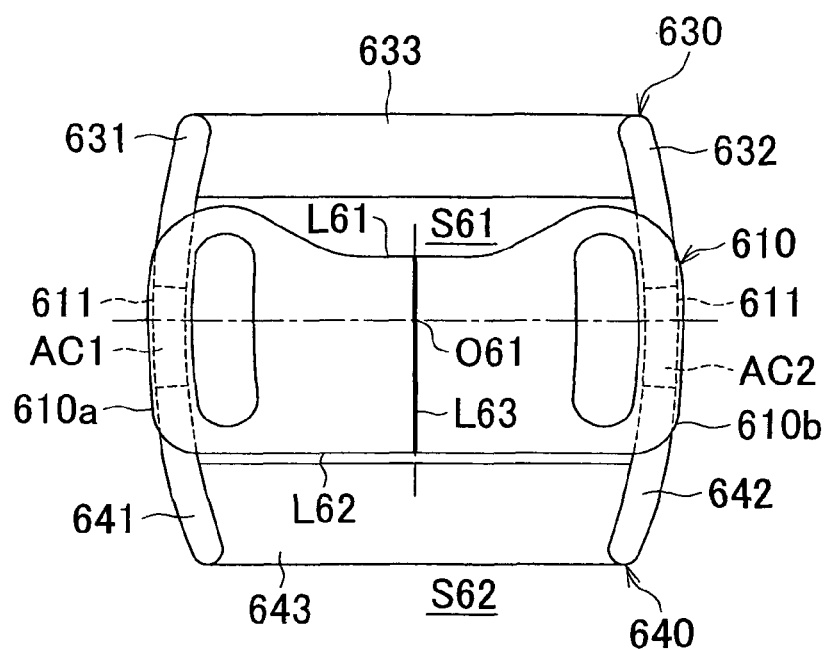
FIG. 19 is a view for explaining an operation of the seventh embodiment shown in FIG. 18, with a support mechanism being in an operated state.
Figure 20:
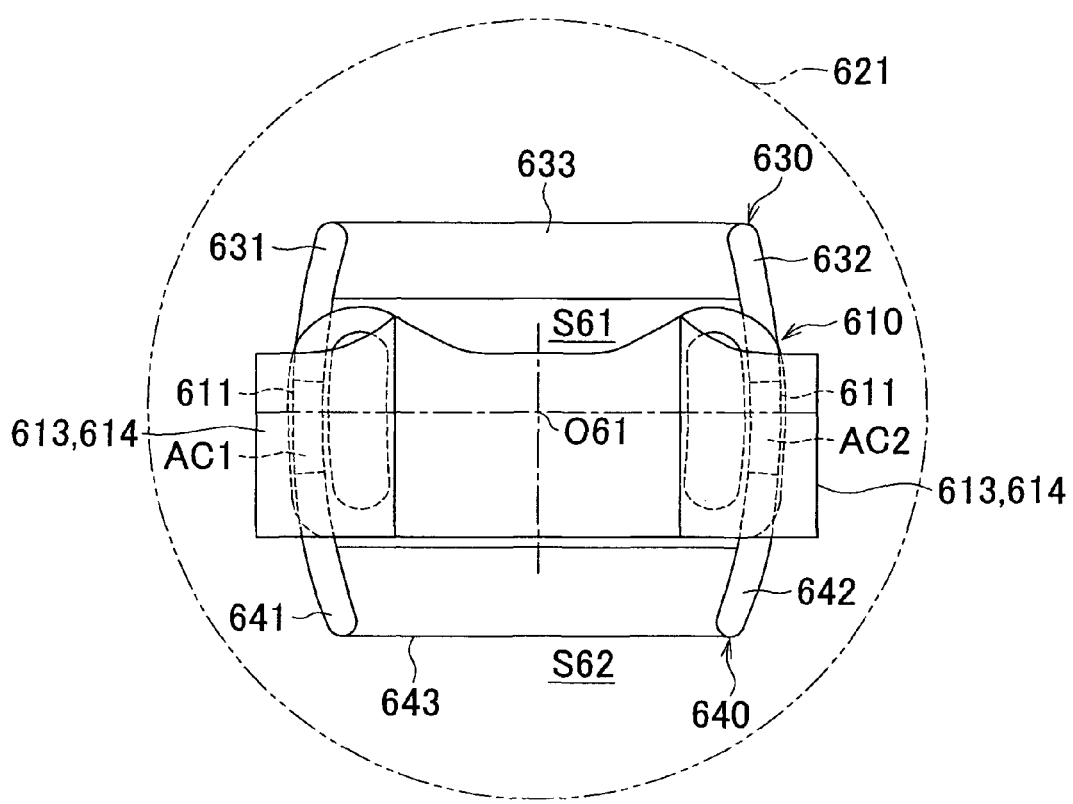
FIG. 20 is a view for explaining an operation of the seventh embodiment shown in FIG. 18, with an airbag being in an operated state.

FIGS. 18 through 20 show a vehicle steering device in accordance with a seventh embodiment of the present invention. The vehicle steering device of the seventh embodiment includes a steering handle 610 and an airbag 621. The steering handle 610 is rotatable about a rotational center O61 and remains downwardly offset by a predetermined amount with respect to a deployed shape of the airbag 621 indicated by an imaginary line.

The steering handle 610 includes grips 610a and 610b on the left and right sides of the steering handle 610 in a straight-ahead driving position (as shown in, e.g., FIG. 18). Non-grip spaces S61 and S62 are formed on the upper and lower sides of the steering handle 610. Each of the non-grip spaces S61 and S62 is a space in which no grip is provided on the steering handle 610, and is provided by forming peripheral edge portions of the steering handle 610 into a non-circular shape.

Each of the grips 610a and 610b is in the form of an arcuate rim and includes a hollow core member 611, a pad 613 and a covering 614. The pad 613 and the covering 614 have the same configuration as the pad 113 and the covering 114 employed in the second embodiment. The hollow core member 611 is connected at its opposite end to a hub (not shown) through spokes (not shown). Like the hub 16 of the first embodiment shown in FIG. 3, the hub of the present embodiment is integrally fixed in a well-known manner to a top end of a main steering shaft (not shown).

As with conventional airbags, the airbag 621 is provided in the steering handle 610 and is between the steering handle 610 and the driver (not shown) to restrain the driver in the event of a collision. As with the first embodiment shown in FIG. 3, the airbag 621 may be stored in a collapsed state within a holder of a housing in a collapsed state and may also be housed inside the housing together with an inflator. Furthermore, the airbag 621 has an opening (not shown) located below the rotational center O61, around which opening the airbag 621 is air-tightly fixed to the holder by means of a ring plate as is the case in the first embodiment shown in FIG. 3. The airbag 621 is deployed from the lower side. In the present embodiment, the pad 613 and the covering 614 are provided to cover the opening of the housing and three tear lines L61, L62 and L63 are formed in the covering 614, as in the first embodiment shown in FIG. 3.

In the seventh embodiment, a support device including an upper support mechanism 630, a lower support mechanism 640 and a pair of left and right actuators AC1 and AC2 is provided in the steering handle 610. The upper support mechanism 630 is provided in a corresponding relationship with the upper non-grip space S61 and is movable upwardly. The lower support mechanism 640 is provided in a corresponding relationship with the lower non-grip space S62 and is movable downwardly. The upward displacement amount of the upper support mechanism 630 is set greater than the downward displacement amount of the lower support mechanism 640.

Each of the support mechanisms 630 and 640 includes a pair of left and right reaction force supporting airbags 631 and 632 or 641 and 642 attached to the hollow core members 611 of the steering handle 610 and a tension cloth (tension member) 633 or 643 fixed at its lateral end portions to the distal end portions of the reaction force supporting airbags 631 and 632 or 641 and 642, the tension cloth 633 or 643 adapted to be taughtly stretched in the non-grip space S61 or S62. Each of the support mechanisms 630 and 640 is movable to an operative position (the position illustrated in FIGS. 19 and 20) independently of the deploying operation of the airbag 621.

Each of the reaction force supporting airbags 631 and 632 or 641 and 642 is in the form of a hollow rod having a closed tip portion and is fitted to the hollow core member 611 of the steering handle 610 in an extendable and retractable manner. In the state as shown in FIG. 18 (a state that the steering handle 610 is in normal use, with the airbag 621 collapsed and stored inside the steering handle 610), each of the reaction force supporting airbags 631 and 632 or 641 and 642 is retracted and received within the steering handle 610 together with the tension cloth 633 or 634. In the state as illustrated in FIG. 19 (a state that the actuators AC1 and AC2 are operated by predicting a vehicle collision, with the airbag 621 not yet deployed) and in the state as depicted in FIG. 20 (a vehicle collision state in which the airbag 621 is deployed as indicated by the imaginary line), each of the reaction force supporting airbags 631 and 632 or 641 and 642 is extended to an operative position together with the tension cloth 633 or 643.

Each of the actuators AC1 and AC2 is an inflator that supplies gas to the respective reaction force supporting airbags 631 and 632 or 641 and 642 and moves the respective support mechanisms 630 and 640 to an operative position. The operation of each of the actuators AC1 and AC2 is controlled by an electric control unit ECU. The electric control unit ECU may predict a vehicle collision based on a signal from a sensor PCS capable of detecting the vehicle collision in advance. Furthermore, the electric control unit ECU operates the actuators AC1 and AC2, when the vehicle collision is predicted, so that the actuators AC1 and AC2 supply gas to the reaction force supporting airbags 631, 632 and 641, 642, respectively.

In the seventh embodiment configured as above, in the event of a collision, it is possible for the actuators AC1 and AC2 to displace the respective support mechanisms 630 and 640 to their operative positions as illustrated in FIG. 19 before deployment of the airbag 621. It is also possible to reduce the possibility of interference (collision) that may occur between constituent parts of the respective support mechanisms 630 and 640 and the driver. In addition, it is possible to obtain the same operational effects as are available in the fourth embodiment illustrated in FIGS. 11 and 12.

In place of the respective support mechanisms 630 and 640 employed in the seventh embodiment, it may be possible to use the support mechanisms 330 and 340 of the fourth embodiment shown in FIGS. 11 and 12, with the reaction force supporting arms 331, 332 and 341, 342 thereof modified into a hollow rod shape having a closed tip portion.

Although the present invention is applied to a steering handle having non-grip spaces on upper and lower sides thereof in the respective embodiments described hereinabove, it may be possible to apply the present invention to a steering handle having a non-grip space on only one of the upper and lower sides. Moreover, the present invention may be embodied by suitably combining the constituent parts of the respective embodiments set forth above.

The invention claimed is:

1. A vehicle steering device comprising:
a rotatable steering handle including grips on left and right sides of the steering handle in a straight-ahead driving position, and being formed to leave a non-grip space extending between the grips on the left and right sides of the steering handle on at least one of upper and lower sides of the steering handle;
an airbag provided in the steering handle that is deployed between the steering handle and a driver to restrain the driver in the event of a collision;
a support unit that is provided with the steering handle, that moves from a stowed position to an operative position on a forward side of the vehicle from a reference plane including a rotating trajectory of a portion of the steering handle normally facing the driver, and is configured to, when in the operative position, support a rear surface of the airbag deployed in the non-grip space; and
a tension member configured to extend along the non-grip space when the tension member is moved to an operative position from a stowed position.

2. The vehicle steering device according to claim 1, wherein the grips respectively include rims projecting toward at least one of the upper and lower sides of the steering handle in the straight-ahead driving position, the support unit including a tension member stretched between the rims when the support unit is in the operative position.

3. The vehicle steering device according to claim 2, wherein the tension member includes engagement portions movably engaged with the rims and a tension fabric integrally attached to the engagement portions and stretched between the rims.

4. The vehicle steering device according to claim 3, wherein the tension fabric is fixedly secured to the airbag at a predetermined portion.

5. The vehicle steering device according to claim 2, wherein the tension member includes engagement portions movably engaged with the rims and a part of the airbag integrally attached to the engagement portions and stretched between the rims.

6. The vehicle steering device according to claim 2, wherein the tension member is a supplemental airbag.

7. The vehicle steering device according to claim 1, wherein the support unit includes reaction force supporting arms rotatably attached to the steering handle and adapted to rotate toward the non-grip space.

8. The vehicle steering device according to claim 7, wherein the reaction force supporting arms are provided in a pair of left and right arms and wherein the tension member stretchable in the non-grip space is provided between distal end portions of the reaction force supporting arms.

9. The vehicle steering device according to claim 8, wherein the tension member is a tension cloth.

10. The vehicle steering device according to claim 9, wherein the tension cloth is fixedly secured to the airbag at a predetermined portion.

11. The vehicle steering device according to claim 1, wherein the support unit includes reaction force supporting arms attached to the steering handle in an extendable and retractable manner and adapted to move toward the non-grip space.

12. The vehicle steering device according to claim 11, wherein the support unit includes a linking string connected to the reaction force supporting arm and to the airbag.

13. The vehicle steering device according to claim 1, wherein the non-grip space is provided both on the upper and lower sides of the steering handle in the straight-ahead driving position, the support unit including an upper support unit and a lower support unit, the steering handle being downwardly offset with respect to a deployed shape of the airbag, the upper support unit having an upward displacement amount greater than a downward displacement amount of the lower support unit.

14. The vehicle steering device according to claim 13, wherein the lower support unit is set to move toward the operative position before movement of the upper support unit.

15. The vehicle steering device according to claim 1, wherein the non-grip space is provided both on the upper and lower sides of the steering handle in the straight-ahead driving position, the support unit including an upper support unit and a lower support unit, the steering handle being upwardly offset with respect to a deployed shape of the airbag, the upper support unit having an upward displacement amount smaller than a downward displacement amount of the lower support unit.

16. The vehicle steering device according to claim 1, wherein the support unit includes a linking unit for moving the support unit to the operative position in association with a deploying operation of the airbag.

17. The vehicle steering device according to claim 1, wherein the support unit moves toward the operative position independently of a deploying operation of the airbag, wherein an actuator for moving the support unit to the operative position is provided in the steering handle, and wherein the actuator is operated in the event of a collision or when a collision is predicted.

18. The vehicle steering device according to claim 17, wherein the support unit includes a pair of left and right reaction force supporting airbags attached to the steering handle in an extendable and retractable manner, and wherein the actuator is an inflator that supplies gas to at least one of the reaction force supporting airbags.

19. The vehicle steering device according to claim 1, wherein the support unit is collapsed together with the airbag and stored in the stowed position within the steering handle.

* * * * *